(12) United States Patent
Itaya

(10) Patent No.: US 7,597,467 B2
(45) Date of Patent: Oct. 6, 2009

(54) LIGHTING UNIT AND LIQUID CRYSTAL DISPLAY DEVICE USING THE LIGHTING UNIT

(75) Inventor: Hideki Itaya, Kanagawa (JP)

(73) Assignee: NEC LCD Technologies, Kanagawa (JP)

( * ) Notice: Subject to any disclaimer, the term of this patent is extended or adjusted under 35 U.S.C. 154(b) by 30 days.

(21) Appl. No.: 11/481,892

(22) Filed: Jul. 7, 2006

(65) Prior Publication Data

US 2007/0014110 A1    Jan. 18, 2007

(30) Foreign Application Priority Data

Jul. 12, 2005    (JP) .............. 2005-202426

(51) Int. Cl.
*F21V 7/00* (2006.01)
(52) U.S. Cl. .............. 362/601; 362/606; 362/607; 362/609; 362/231; 362/246
(58) Field of Classification Search ........... 362/601, 362/231, 246; 385/129
See application file for complete search history.

(56) References Cited

U.S. PATENT DOCUMENTS

| 3,984,176 | A | * | 10/1976 | Hirai et al. .............. 349/65 |
|---|---|---|---|---|
| 5,913,594 | A | | 6/1999 | Iimura |
| 6,039,452 | A | * | 3/2000 | Iimura .............. 362/607 |
| 6,361,180 | B1 | * | 3/2002 | Iimura .............. 362/616 |
| 6,447,133 | B1 | * | 9/2002 | Eschke et al. .......... 362/629 |
| 6,951,401 | B2 | * | 10/2005 | Van Hees et al. ........ 362/612 |
| 6,992,827 | B2 | * | 1/2006 | Sakai et al. .............. 359/599 |
| 7,104,665 | B2 | * | 9/2006 | Kato .............. 362/84 |
| 2004/0119908 | A1 | | 6/2004 | Sakai |
| 2006/0146573 | A1 | * | 7/2006 | Iwauchi et al. .......... 362/621 |
| 2006/0291238 | A1 | * | 12/2006 | Epstein et al. .......... 362/600 |

FOREIGN PATENT DOCUMENTS

| JP | 9-26510 | 1/1997 |
|---|---|---|
| JP | 2000-36209 | 2/2000 |
| JP | 2001-250410 | 9/2001 |
| JP | 2005-158370 | 6/2005 |

* cited by examiner

*Primary Examiner*—Sandra L O'Shea
*Assistant Examiner*—Evan Dzierzynski
(74) *Attorney, Agent, or Firm*—Young & Thompson

(57) ABSTRACT

In a liquid crystal display device using LEDs emitting a plurality of colors as the light sources, diffusion materials are dispersed in a light guide plate. The light guide plate is used to guide and mix the plurality of colors with one another. The diffusion materials are made of a material having optical characteristics, such as a refractive index, different from those of a base material of the light guide plate.

4 Claims, 4 Drawing Sheets

LIGHTING UNIT AND LIQUID CRYSTAL DISPLAY DEVICE USING THE LIGHTING UNIT

BACKGROUND OF THE INVENTION

1. Field of the Invention

The present invention relates to a lighting unit and a liquid crystal display device using the lighting unit, and more particularly relates to a structure of a light guide plate used in the lighting unit.

2. Description of Related Art

Liquid crystal display (LCD) devices have several features, such as thinness, lightweight and low power consumption. Because of these features, LCD devices are widely used in fields including Office Automation (OA) machines, Audio and Visual (AV) appliances and cell phone terminal devices. In case of transmissive LCD devices, the display includes a backlight to irradiate a rear surface of the LCD panel. The LCD device indicates information by controlling the amount of transmitting rays of light emitted from the backlight light sources. Fluorescent lamps have been used as the backlight light sources. In recent years, however, light-emitting diodes (LEDs) are used instead of the fluorescent lamps. That is because fluorescent lamps need peripheral circuits, such as inverter circuits, to turn on the lamps, and because the inverter circuits for the fluorescent lamps make noise. Especially, LEDs emitting red (R) green (G) blue (B) color, respectively, are used together to obtain a white color for backlighting by mixing the three colors.

A LCD device of a conventional type using LEDs for R, G and B colors as the light sources is made up of LED light sources, a LCD device, one or more light guide plates, a reflection plate, and an optical sheet. The LED light sources emit rays of light of R, G and B colors. The light guide plates guide emitted light from the LED light sources to the LCD panel. The reflection plate reduces loss of light transmitted to the LCD panel. The optical sheet distributes light supplied to the LCD panel uniformly.

Each of the LEDs serves as a point light source. Each of the LEDs is usually provided with a lens in order to provide directivity of light intensity as regards an angle of external light emissions. The directivity of light intensity causes the LED chip to emit rays of light with a brightness corresponding to the angle. For this reason, in the vicinity of each of the LEDs, rays of light tend to influence the directional characteristics of the LEDs. As a result, the arrangement of LEDs causes high and low intensities of the ray of light. In particular, this causes a problem in that the high and low intensities of the rays of light are displayed on the LCD panel in the form of color irregularity in a case where the white color is realized by use of LEDs respectively for the R, G and B colors.

With this taken into consideration, the dimension of the light guide plate from the LED light sources to the LCD panel is elongated to reduce color un-uniformity caused by color mixing of different color of light. A group of point light sources is arranged away from the edge of the light guide plate in order that the intervals of the adjacent LEDs and the distance between the group of LEDs and the edge of the light guide plate can satisfy predetermined relationships. This method is proposed in Japanese Patent Laid-open No. 2000-36209.

In a case where a plurality of types of LEDs emitting mutually different colors are intended to be used as light sources, it is important that rays of light respectively representing mutually different color rays of light should be evenly mixed with one another in the aforementioned manner to obtain a uniform mixed color. For this reason, the dimension of the light guide plate from the LED light sources to the LCD panel is designed to be elongated. However, this method imposes restrictions on the structural design because a long distance is required for color mixing from the LED light sources to a display area. As a result, the dimension of the light guiding plate needs to be enlarged, and the size of the LCD device as a whole is accordingly enlarged. In addition, the weight of it is increased.

SUMMARY OF THE INVENTION

Therefore, an exemplary feature of the invention is to provide a lighting unit and a LCD device using the lighting unit, whose sizes and weights can be decreased, and which can generate rays of light with less color un-uniformity by use of their respective simple structures.

Specifically, a lighting unit of the present invention, comprises LED light sources emitting a plurality of different colors; and a light guide plate for receiving the plurality of different colors, mixing the plurality of different colors and emitting a mixed light for a display panel; wherein diffusion materials are dispersed in the light guide plate, and wherein the diffusion materials have an optical characteristic different from that of a base material of the light guiding plate.

In one embodiment, the diffusion materials are dispersed uniformly in the base material of the light guide plate.

In another embodiment, the diffusion materials are dispersed non-uniformly in the base material of the light guide plate.

When the diffusion materials are distributed non-uniformly, they may be present at a higher concentration in a region of the light guide plate adjacent the LED light sources.

When the diffusion materials are distributed non-uniformly, it is also possible, alternatively or in addition to the above embodiment, that the diffusion materials be present at a higher concentration adjacent each of the two major surfaces of the light guide plate, relative to a more central region between the major two surface portions.

It is preferred that the lighting unit further comprises a sheet with a high reflectance formed on a surface of the light guide plate.

Another embodiment of a lighting unit of the present invention comprises LED light sources emitting a plurality of different colors; a first light guide plate for receiving the plurality of different colors, mixing the plurality of different colors and emitting a mixed light; and a second light guide plate for receiving the mixed light from the first light guide plate and emitting the mixed light for a display panel; and wherein diffusion materials are dispersed in the first light guide plate, and wherein the diffusion materials have an optical characteristic different from that of a base material of the light guiding plate.

Diffusion materials may also be dispersed in the second light guide plate, in which case such diffusion materials also have an optical characteristic different from that of a base material of the second light guiding plate.

The lighting unit may further comprises a reflector guiding the mixed light from the first light guide plate to the second light guide plate.

The lighting unit may further comprise a light guiding member guiding the mixed light from the first light guide plate to the second light guide plate.

Diffusion materials may be dispersed in the light guiding member, and such diffusion materials should have an optical characteristic different from that of a base material of the light guiding member.

LCD devices according to the invention comprise a LCD panel; and a lighting unit according to any of the embodiments described above.

With the lighting units according to the invention and the LCD devices using them, it is possible to achieve reduced size and weight, and to generate rays of light with less color un-uniformity by use of their relatively simple structures.

The diffusion materials dispersed in the light guide plate aid in mixing the colors represented by rays of light emitted from LED light sources. The diffusion materials are made of a material having optical characteristics, such as refractive index, which are different from those of a base material of the light guide plate. Incident rays of light are diffused by use of these diffusion materials. Accordingly, this makes it possible to shorten a distance of the light guide plate from the LED light sources, which distance is required for the colors to be mixed, and thereby reduce color irregularity in a display area while aiming at reducing the dimension of the light guide plate. While the invention provides structure permitting the size and weight of LCD displays to be reduced, the appended claims are intended to cover such structure regardless whether a designer of such displays takes advantage of this size and weight reduction capability.

BRIEF DESCRIPTION OF THE DRAWINGS

These and other objects and advantages and further description of the invention will be more apparent to those skilled in the art by reference to the following description of various preferred embodiments, taken in connection with the accompanying drawings, in which.

DETAILED DESCRIPTION OF THE PREFERRED EMBODIMENTS

Hereinafter, descriptions will be provided for specific configurations of the LCD device with reference to FIGS. 1 to 7.

Figure 1:
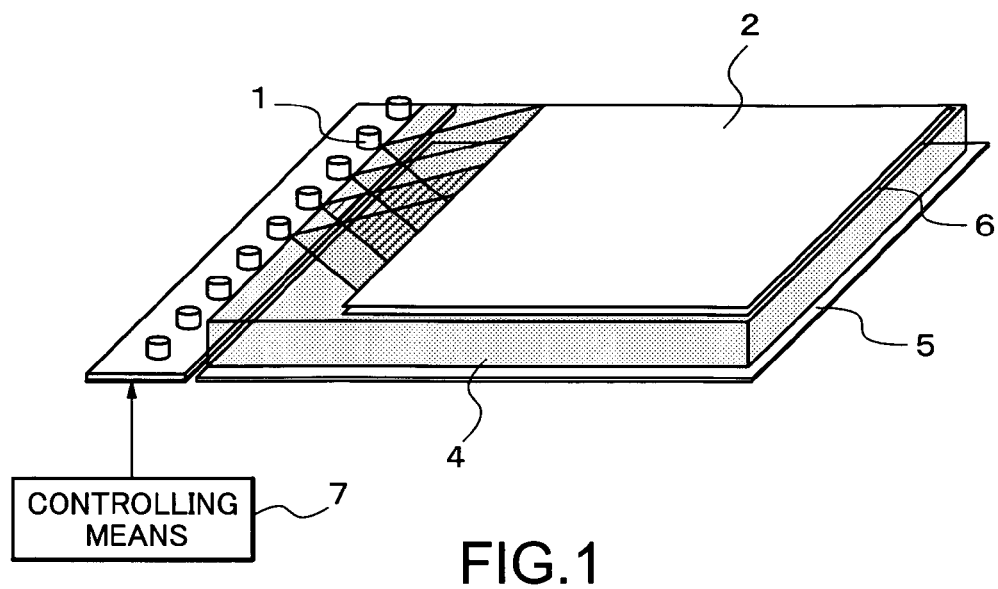
FIG. 1 is a perspective view schematically showing a configuration of a LCD device using a lighting unit according to a first embodiment of the present invention.
Figure 2:
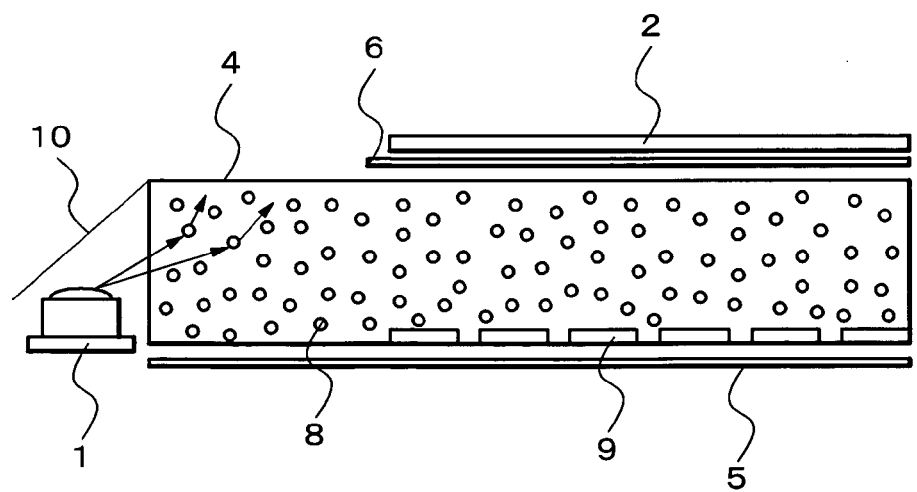
FIG. 2 is a vertical cross-sectional view showing the configuration of the LCD device according to the first embodiment of the present invention.
Figure 3:
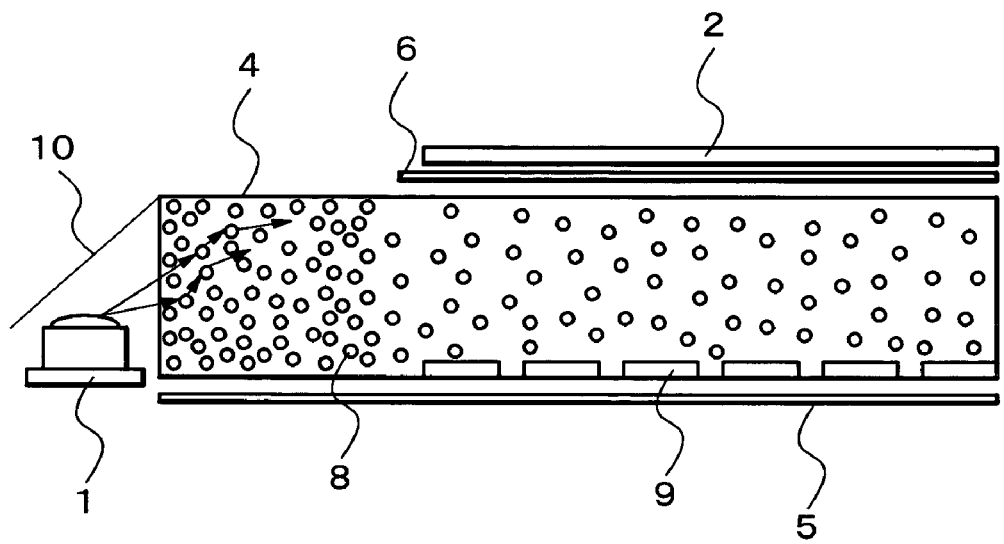
FIG. 3 is a vertical cross-sectional view showing another configuration of the LCD device according to the first embodiment of the present invention.
Figure 4:
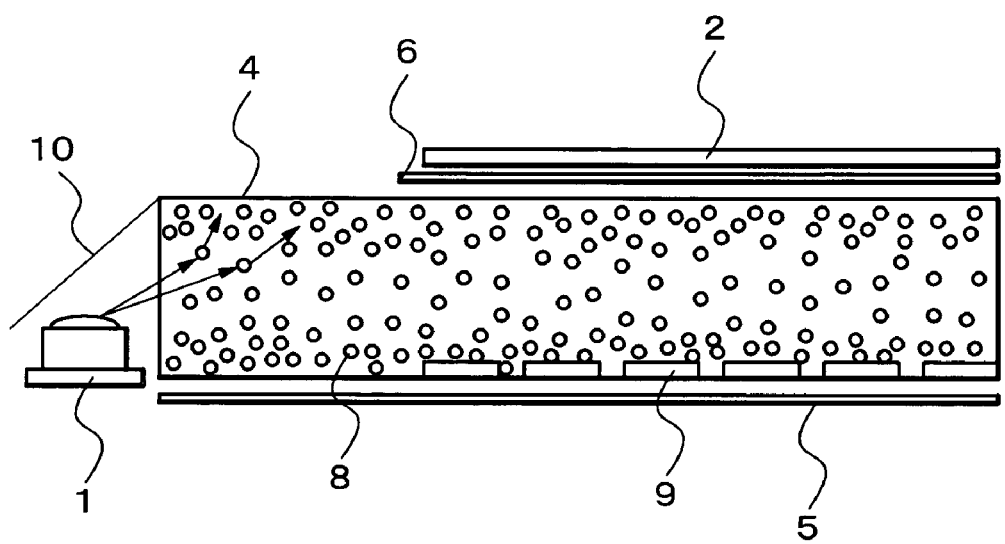
FIG. 4 is a vertical cross-sectional view showing yet another configuration of the LCD device according to the first embodiment of the present invention.

Descriptions will be provided for a lighting unit and a LCD device using the lighting unit according to the first embodiment of the present invention with reference to FIGS. 1 to 4. As shown in FIGS. 1 and 2, the LCD device according to the embodiment are mainly composed of LED light sources 1 for red (R), green (G) and blue (B) colors, controlling means 7, a LCD panel 2, a light guide plate 4, a reflection plate 5, an optical sheet 6 and a reflector 10. The controlling means 7 controls brightness of each of the LED light sources 1. The reflector 10 makes the light emitted from each of the LED light sources 1 incident on the light guide plate 4. The light guide plate 4 mixes the three colors emitted from the LED light sources 1 and guides mixed light to the LCD panel 2. Reflection patterns 9 are arranged on a surface of the light guide plate 4, the surface being closer to the reflection plate 5. The reflection plate 5 reduces loss of light and increase light transmitted to the LCD panel 2. The reflection plate 5 is made of a metallic plate or the like. The LCD panel 2 is that on which images are displayed. The optical sheet 6 located between the light guide plate 4 and the LCD panel 2 makes uniform the light transmission to the LCD panel 2. The optical sheet 6 is made of a diffusion sheet. In addition, in case of this embodiment, diffusion materials 8 are dispersed inside the light guide plate 4. Optical characteristics of the diffusion materials 8 are different from those of the base material of the light guide plate 4.

It should be noted that it suffices that the diffusion materials 8 are made of a material whose optical characteristics are different from those of the base material of the light guide plate 4. It is possible that diffusion materials 8 of more than one type, each of which has a refractive index different from that of the base material, be dispersed in the base material. It is also possible to use metallic particles of more than one type, each of which has a reflectance larger than that of the base material, are dispersed in the base material. It is furthermore possible to use the former diffusion materials 8 and the latter diffusion materials 8 made of the metallic particles are dispersed in mixture inside the light guide plate 4.

In addition, no specific restriction is imposed on a method of manufacturing the light guide plate 4. The light guide plate 4 can be manufactured, for example, by use of the following method. A base material made of a translucent resin is melted, and the diffusion materials 8 are mixed with the melted base material, followed by agitating. Thereafter, the resultant base material is hardened to form the light guide plate 4.

Furthermore, it suffices that the diffusion materials 8 are large enough to refract or reflect the light emitted from each of the LED light sources 1 for the R, B and G colors in the light guide plates 4. No specific restriction is imposed on sizes of the diffusion materials 8. The diffusion materials 8 may be all the same, or may be of a plurality of types, which are different from one another in size. In FIG. 2, the diffusion materials 8 are dispersed uniformly in the base material of the light guide plate 4. However, it is also possible to distribute the diffusion materials 8 randomly, or in a predetermined non-uniform manner as in the embodiments of FIGS. 3 and 4. In the case shown in FIG. 3, the diffusion materials 8 are dispersed in a higher concentration in a region of the light guide plate 4 extending from adjacent the LED light sources 1 to a vicinity of the LCD panel 2, compared with a region underlying the LCD panel 2. The distance between the side near the LED light sources 1 and the edge of the LCD panel 2 can thus be made shorter. In the case shown in FIG. 4, the distribution concentration of the diffusion materials 8 is varied in the depth direction of the light guide plate 4. In particular, the diffusion materials 8 are dispersed at a higher concentration near the two major surfaces of the light guide plate 4, compared with a more central region between the two major surfaces.

The operation of a LCD device including a lighting unit as described above, will now be described. In the case of the LCD device according to this example, the controlling means 7 causes the LED light sources 1 for the R, G and B colors to respectively light with a predetermined brightness set for each color. Light emitted from each of the LED light sources 1 is guided to the light guide plate 4 directly or after being reflected off the reflector 10.

In the lighting unit of this embodiment, light incident on the light guide plate 4 is refracted and diffused due to an effect of the diffusion materials 8 having optical characteristics different from those of the base material contained in the light guide plate 4, as shown in FIG. 2. For example, a refractive index of the diffusion materials 8 is different from those of the base material contained in the light guide plate 4. This refraction effect diffuses the intensity of the light traveling straight in the light guide plate 4. This decreases the difference among the light intensities caused by directional characteristics of LEDs. Accordingly, this makes it possible to decrease a distance from the LED light sources 1 respectively for uniform three color mixing. According to this embodiment, even if the light path formed in the light guide plate 4 from the LED light sources 1 to the LCD panel 2 is short, the incident light from the LED light sources 1 are uniformly mixed in the light guide plate 4. Therefore, the width of the light guide plate 4 can be designed to be narrower. Consequently, this makes it possible to make a lighting unit and a LCD device containing it, whose size and weight can be decreased, and which can generate rays of light with more color regularity.

A lighting unit according to a second embodiment of the invention, and a LCD device using it, will now be described with reference to FIG. 5. In the case of the first embodiment, a single light guide plate 4 is used, and thus rays of light emitted respectively from the LED light sources 1 for the R, G and B colors are mixed with one another by use of this light guide plate 4. In the case of this embodiment, however, the light guide plate is divided into two parts for further reducing the size of the LCD device.

Figure 5:
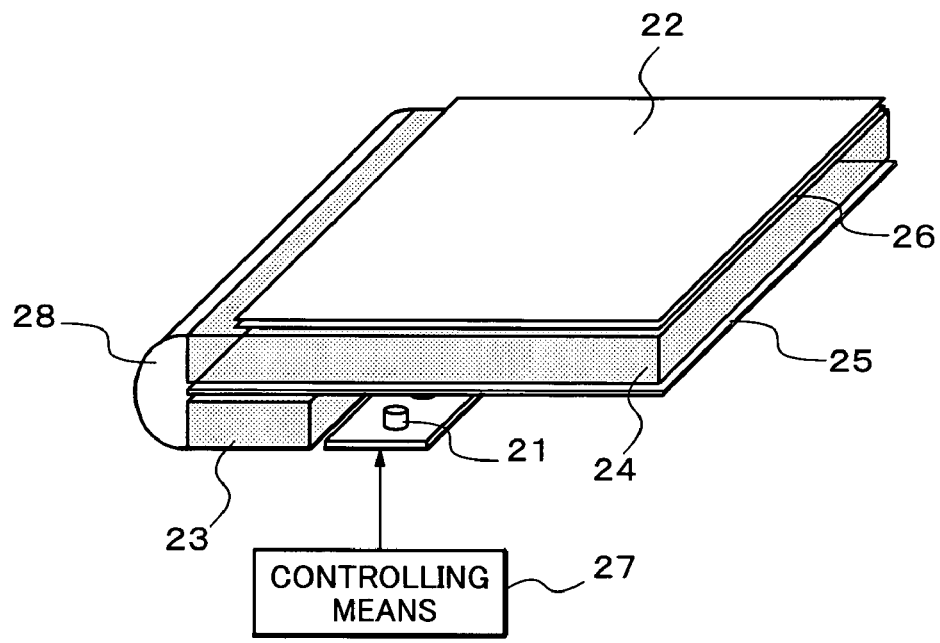
FIG. 5 is a perspective view schematically showing a configuration of a LCD device using a lighting unit according to a second embodiment of the present invention.

Specifically, as shown in FIG. 5, LED light sources 21 emitting R, G and B colors, as well as a mixing light guide plate 23 in which diffusion materials are dispersed, are arranged in the rear of a surface of a LCD panel 22, the surface being that on which light is incident. The mixing light guide plate 23 mixes the three colors emitted from the LED light sources 21 in cooperation with the diffusion materials dispersed in the mixing light guide plate 23. Light mixed in the mixing light guide plate 23 is designed to be guided to a main light guide plate 24 by means of a reflector 28 formed by processing a metal plate or the like. The main light guide plate 24 guides the mixed lights to the LCD panel 22. Controlling means 27 controls brightness of each of the light sources 21. Reflection plate 25 reduces loss of light and increases light transmitted to the LCD panel 22. The LCD panel 22 is that on which images are displayed. The optical sheet 26 located between the main light guide plate 24 and the LCD panel 22 makes uniform the light transmission to the LCD panel 22.

The main light guide plate 24 and the mixing light guide plate 23 may be formed of the same material or of respectively different materials. In addition, the relative thicknesses of the two light guide plates may be the same or different. The main light guide plate 24 may be made thicker than the mixing light guide plate 23, and other modifications can be made. Furthermore, it suffices that, as in the case of the first embodiment, the material of the diffusion materials is different in optical characteristics from the base material of the light guide plate. The material, size, and distribution of the diffusion materials can be varied as discussed above in connection with the first embodiment.

In this embodiment, rays of light emitted from the LED light sources 21 arranged in the rear are diffused by the main light guide plate 24 and the mixing light guide plate 23, in the aforementioned manner. However, it is also possible that light diffusing material is provided in light guide plate 23 but not in light guide plate 24. This configuration also makes it possible to realize a LCD device whose dimension is further reduced compared with the first embodiment, and which reduces un-uniformity in color intensity caused by mixture of different colors.

A third embodiment will now be described with reference to FIG. 6. This embodiment is a modification to the second embodiment of the invention. Elements that are common to the previous embodiments are denoted by the same reference numerals and their description will not be repeated. In the case of the second embodiment, the reflector 28 is used to guide the light mixed in the mixing light guide plate 23 to the main light guide plate 24. In the case of this embodiment, however, for the purpose of more efficiently mixing rays of light emitted respectively from LED light sources emitting R, G and B colors, the rays of light are designed to be capable of being mixed in a part which guides the rays of light to the main light guide plate 24 from the mixing light guide plate 23 as well.

Figure 6:
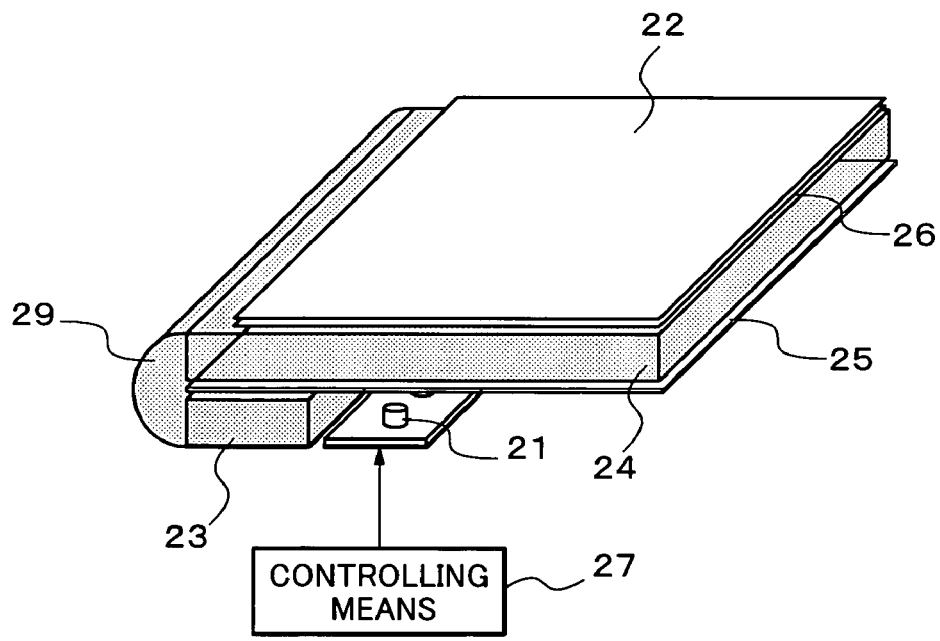
FIG. 6 is a perspective view schematically showing a configuration of a LCD device using a lighting unit according to a third embodiment of the present invention.

Specifically, as shown in FIG. 6, LED light sources 21 emitting R, G and B colors, as well as a mixing light guide plate 23 in which the diffusion materials are dispersed, are arranged in the rear of the LCD panel 22. In addition, a light guiding member 29 containing the diffusion materials is arranged in the part, which guides the rays of light to the main light guide plate 24 from the mixing light guide plate 23 as well. The main light guide plate 24, the mixing light guide plate 23 and the light guiding member 29 may be formed of the same material or respectively of different materials. Furthermore, it suffices that, as in the case of the first embodiment, the material of the diffusion materials is different from the base material in optical characteristics. The material, size, and distribution of the diffusion materials can be varied as described above in connection with the previous embodiments.

The distribution of diffusion materials in the main light guide plate 24, the mixing light guide plate 23 and the light guiding member 29 in this manner makes it possible to realize a LCD device whose dimension is reduced, and which further reduces color irregularity caused by color mixing. It is also possible in this embodiment to omit the diffusing materials in one or both of the light guide plates 23 and 24

A fourth embodiment will now be described with reference to FIG. 7. In the case of third embodiment, rays of light are preferably mixed in each of the mixing light guide plate 23, the main light guide plate 24 and the light guiding member 29. In the case of this embodiment, however, the mixing light guide plate 23, the main light guide plate 24 and the light guiding member 29 of the third embodiment are formed integrally for the purpose of reducing loss of rays of light traveling in and out of each of the mixing light guide plate 23, the main light guide plate 24 and the light guiding member 29.

Figure 7:
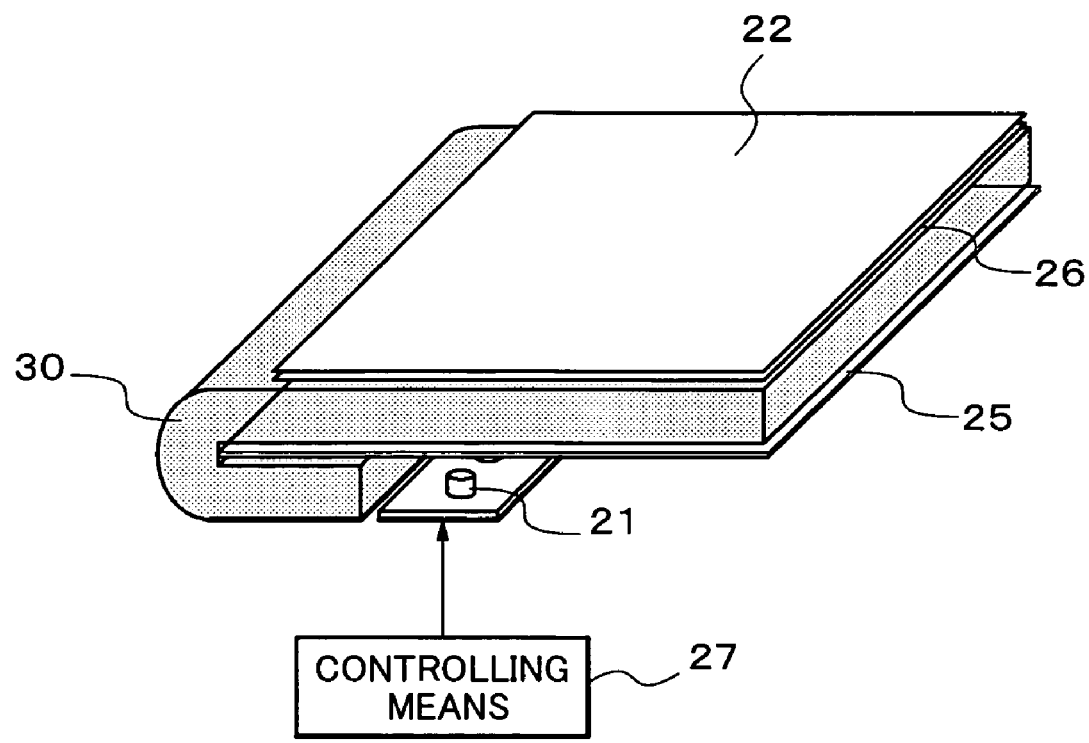
FIG. 7 is a perspective view schematically showing a configuration of a LCD device using a lighting unit according to a fourth embodiment of the present invention.

Specifically, as shown in FIG. 7, LED light sources 21 emitting R, G and B colors are arranged in the rear of the LCD panel 22, and a light guide plate 30 is used in a vicinity of the light sources. The light guide plate 30 is obtained by integrally forming a mixing light guide plate, a main light guide plate and light guiding means. As shown in FIG. 7, the light guide plate 30 has an asymmetrical cross section in the shape of the letter U. In addition, the mixing light guide plate and the main light guide plate are connected to each other through the light guide. It suffices that, as in the case of the first embodiment, the material of the diffusion materials is different in optical characteristics from the base material of the light guide plate 30. The material, size, and distribution of the diffusion materials can be varied as described above in connection with the previous embodiments. Moreover, the method of manufacturing the light guide plate 30 is also not limited. For example, the light guide plate 30 can be formed by casting a material, which is obtained by dispersing the diffusion materials in the base material, in a mold. The light guide plate 30 could alternatively be formed by forming a plate-shaped member, which is obtained by dispersing the diffusion materials in the base material, and by subsequently folding this member while heat is being applied to the member.

The provision of a light guide plate obtained by forming integrally the main light guide plate, the mixing light guide plate and the light guiding member makes it possible to realize a LCD device having low light loss, improved brightness efficiency and reduced size. In addition, color un-uniformity caused by color mixing is reduced.

A fifth embodiment will now be described. In the above four embodiments, rays of light emitted from the LED light sources are diffused in various directions by the variously-configured diffusion materials and structures of those embodiments. As a result, the rays of light may leak out of the front surface and the rear surface of each of the guide members.

In the fifth embodiment, a sheet with a high reflectance can be adhered to any or all of the surfaces of the light guide plates shown in FIGS. 1 to 5. For example, a metallic film with a high reflectance can be formed on any one or more of the surfaces of the light guide plates shown in FIGS. 1 to 5 by means of deposition or the like.

Such a configuration makes it possible to realize a LCD device with the following features. The sheet with a high reflectance allow to reflect rays toward a different direction from the LCD panel and reduce loss of rays of light. Brightness efficiency is improved. In addition, color irregularity caused by color mixing is also reduced.

Although various preferred embodiments have been described above, the present invention is not limited thereto and various changes and applications are possible. For example, in the case of each of the foregoing embodiments, the diffusion materials 8 are dispersed in all of the light guide plates, such as the light guide plate 4, the mixing light guide plate 23, the main light guide plate 24 and the light guide plate 30, and the light guiding member 29. However, it should be noted that the present invention is not limited to the foregoing embodiments. It suffices that the diffusion materials are dispersed in at least part of these light guide plate or the light guiding member.

Moreover, in the case of each of the foregoing embodiments, LEDs for each of the three colors are used. It is enough that LEDs for the lighting unit are used to configure of a plurality of types of LEDs respectively emitting rays of light which turn into white light when mixed. For example, in a case where a mixture of two colors generates white light, the LED may be used to configure by two different colors of LEDs. In a case where mixture of four or more colors generates white light, the LED may be used to configure by four or more different colors of LEDs.

Furthermore, in the case of each of the foregoing embodiments, white light is generated by mixing different colors. Similarly, however, the present invention can be applied to a case where light of a desired color rather than white is generated.

The present invention can be applied to any lighting equipment that includes a plurality of types of LEDs generating different colors, and to any display device that illuminates the display panel by use of this lighting unit.

Although preferred embodiments of the invention has been described with reference to the drawings, it will be obvious to those skilled in the art that various changes or modifications may be made without departing from the true scope of the invention.

What is claimed is:

1. A lighting unit comprising:
LED light sources emitting a plurality of colors; and
a light guide plate for receiving the plurality of colors, mixing the plurality of colors and emitting a mixed light for a display panel;
wherein diffusion materials are dispersed in the light guide plate, and wherein the diffusion materials have an optical characteristic different from that of a base material of the light guide plate; and
wherein the diffusion materials are dispersed at a higher concentration in a region of the light guide plate adjacent the LED light sources than a concentration at other parts of the light guide plate.

2. The lighting unit according to claim 1, further comprising a high reflectance sheet on a surface of the light guide plate.

3. A liquid crystal display device comprising:
a liquid crystal display panel; and
a lighting unit having light-emitting diode (LED) light sources emitting a plurality of colors, and a light guide plate for receiving the plurality of colors, mixing the plurality of colors and emitting a mixed light for the liquid crystal display panel;
wherein diffusion materials are dispersed in the light guide plate, and wherein the diffusion materials have an optical characteristic different from that of a base material of the light guide plate,
wherein the diffusion materials are dispersed at a higher concentration in a region of the light guide plate adjacent the LED light sources, relative to a region underlying the liquid crystal panel.

4. A lighting unit comprising:
light-emitting diode (LED) light sources emitting a plurality of different colors;
a first light guide plate for receiving the plurality of colors, mixing the plurality of colors and emitting a mixed light;
a second light guide plate for receiving the mixed light from the first light guide plate and emitting the mixed light for a display panel; and
a reflector adjacent to the first and second light guide plates, said reflector guiding the mixed light from the first light guide plate to the second light guide plate,
wherein diffusion materials are dispersed in the first light guide plate, and wherein the diffusion materials have an optical characteristic different from that of a base material of the first light guide plate,
further comprising a light guiding member guiding mixed light from the first light guide plate to the second light guide plate, wherein diffusion materials are dispersed in the light guiding member, and wherein the diffusion materials have an optical characteristic different from that of a base material of the light guiding member, wherein the light guiding member is a different material than that of said first and second light guide plates.

* * * * *

UNITED STATES PATENT AND TRADEMARK OFFICE
CERTIFICATE OF CORRECTION

PATENT NO.       : 7,597,467 B2  
APPLICATION NO.  : 11/481892  
DATED            : October 6, 2009  
INVENTOR(S)      : Hideki Itaya Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 68 days.

Signed and Sealed this

Twenty-eighth Day of September, 2010

David J. Kappos  
*Director of the United States Patent and Trademark Office*